(12) United States Patent
Dudar

(10) Patent No.: US 10,197,000 B1
(45) Date of Patent: Feb. 5, 2019

(54) SYSTEMS AND METHODS FOR DIAGNOSING A VEHICLE HUMIDITY SENSOR

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 23 days.

(21) Appl. No.: 15/660,015

(22) Filed: Jul. 26, 2017

(51) Int. Cl.
| | |
|---|---|
| *F01N 3/10* | (2006.01) |
| *F01N 3/20* | (2006.01) |
| *F02D 41/00* | (2006.01) |
| *F02D 41/22* | (2006.01) |
| *F01N 9/00* | (2006.01) |
| *B01D 53/94* | (2006.01) |
| *F02N 11/00* | (2006.01) |

(52) U.S. Cl.
CPC ....... *F02D 41/222* (2013.01); *B01D 53/9418* (2013.01); *B01D 53/9495* (2013.01); *F01N 3/208* (2013.01); *F01N 3/2066* (2013.01); *F01N 9/005* (2013.01); *F02D 41/0002* (2013.01); *F02D 41/004* (2013.01); *F02D 41/005* (2013.01); *F02D 41/0077* (2013.01); *F01N 2560/028* (2013.01); *F01N 2610/02* (2013.01); *F02D 2200/0418* (2013.01); *F02D 2250/06* (2013.01); *F02N 11/00* (2013.01); *Y02T 10/40* (2013.01); *Y02T 10/47* (2013.01)

(58) Field of Classification Search
CPC .. F01N 3/2066; F01N 3/208; F01N 2560/028; F01N 2610/02; F02N 11/00; F02D 41/222; F02D 41/0002; F02D 41/0077; F02D 41/004; F02D 41/005; F02D 2200/0418; F02D 2250/06; F01D 53/9418; F01D 53/9495; Y02T 10/40; Y02T 10/47; F02M 26/01
USPC .......... 60/274, 277, 286, 295, 285, 299–301
See application file for complete search history.

(56) References Cited

U.S. PATENT DOCUMENTS

| 6,073,480 A | 6/2000 | Gokhfeld |
|---|---|---|
| 6,763,298 B2 | 7/2004 | Boggs et al. |
| 7,318,409 B2 | 1/2008 | Cullen |

(Continued)

OTHER PUBLICATIONS

Sluder, C. et al., "Low Temperature Urea Decomposition and SCR Performance," Proceeding of the SAE 2005 World Congress and Exhibition, Apr. 11, 2005, Detroit, Michigan, 9 pages.

(Continued)

*Primary Examiner* — Audrey K Bradley
*Assistant Examiner* — Dapinder Singh
(74) *Attorney, Agent, or Firm* — Julia Voutyras; McCoy Russell LLP

(57) ABSTRACT

Methods and systems are provided for diagnosing a humidity sensor positioned in an intake system of a vehicle engine system. In one example, a method comprises rotating an engine unfueled in reverse and injecting a fluid into an exhaust system of the engine system, to draw the fluid into the intake system, where a humidity sensor output signal greater than a baseline output signal by a predetermined threshold is indicative of a humidity sensor that is functioning as desired. In this way, a humidity sensor may be periodically rationalized which may prolong engine lifetime by ensuring the engine is operating at optimal parameters.

20 Claims, 5 Drawing Sheets

(56) References Cited

U.S. PATENT DOCUMENTS

| | | | |
|---|---|---|---|
| 7,715,976 B1 | 5/2010 | Kiao et al. | |
| 8,739,766 B2 | 6/2014 | Jentz et al. | |
| 9,074,548 B2 | 7/2015 | Surnilla et al. | |
| 9,249,764 B2 | 2/2016 | Wiggins et al. | |
| 9,329,160 B2 | 5/2016 | Pursifull et al. | |
| 9,382,861 B2 | 7/2016 | Jankovic et al. | |
| 9,482,172 B2 | 11/2016 | Pursifull et al. | |
| 9,828,949 B2 * | 11/2017 | Surnilla | F02D 41/005 |
| 9,879,630 B2 * | 1/2018 | Guo | F02D 41/1456 |
| 2004/0069273 A1 * | 4/2004 | Visser | F02P 5/1502 123/406.47 |
| 2005/0072406 A1 * | 4/2005 | Cullen | F01L 1/34 123/494 |
| 2005/0072411 A1 * | 4/2005 | Cullen | F02D 41/021 123/690 |

OTHER PUBLICATIONS

Dudar, A. "Systems and Methods for Indicating Canister Purge Valve Degradation," U.S. Appl. No. 15/202,288, filed Jul. 5, 2016, 67 pages.

Dudar, A. "Method and System for a Humidity Sensor in a Vehicle Techncal Field," U.S. Appl. No. 15/474,386, filed Mar. 30, 2017, 23 pages.

* cited by examiner

SYSTEMS AND METHODS FOR DIAGNOSING A VEHICLE HUMIDITY SENSOR

FIELD

The present description relates generally to methods and systems for rationalizing a humidity sensor positioned in an intake system of a vehicle.

BACKGROUND/SUMMARY

Engine systems may be configured with exhaust gas recirculation (EGR) systems via which at least a portion of the exhaust gas is recirculated to the engine intake. Various sensors may be coupled in the engine system to estimate the amount of EGR being delivered to the engine. These may include, for example, various temperature, pressure, oxygen, and humidity sensors. Since the accuracy of the EGR estimation relies on the correct functioning of the various sensors, periodic sensor diagnostics are used. Further, engines with or without EGR need an estimate of air dilution to optimally set the ignition timing, among other controls. Combustion air dilution may be determined based on humidity measurements using humidity sensors, for example.

One example approach for diagnosing a humidity sensor is illustrated by Xiao et al. in U.S. Pat. No. 7,715,976. Therein, humidity sensor degradation is determined based on a comparison of an intake humidity estimated by a first humidity sensor in the intake manifold with an exhaust humidity estimated by a second humidity sensor in the exhaust manifold and an ambient humidity estimated by a third humidity sensor located outside of the engine. The sensor readings are compared during conditions when all the sensor readings are expected to be substantially equal, such as during engine non-fueling conditions in which the EGR valve is closed. If the readings of the three humidity sensors differ by more than a threshold, humidity sensor degradation may be determined.

However, the inventors herein have identified a potential issue with such an approach. The accuracy of determining degradation of any one humidity sensor may depend on the proper functioning of the other humidity sensors. Further, multiple humidity sensors may not be needed for engine control, and thus additional humidity sensors may not be available for comparison.

Another example approach for diagnosing a humidity sensor is illustrated by Pursifull et al. in U.S. Pat. No. 9,482,172. Therein, humidity sensor degradation is indicated based on a comparison of a response of the humidity sensor to a first gas flow and a second gas flow having a known humidity, or at least where the second gas flow is known to have a significantly different humidity than the first gas flow. The second gas flow may include intake manifold air, EGR, exhaust gas, and/or crankcase gas, for example. If the humidity sensor output is different than an expected output when the sensor is exposed to the second gas flow, degradation of the humidity sensor may be indicated.

However, the inventors herein have identified a potential issue with such an approach. For example, such an approach may be susceptible to false indications of degraded humidity sensor(s) if a difference in humidity of the first gas and the second gas is not enough to trigger a significant response in the humidity sensor during the second gas flow as compared to the first. Furthermore, such an approach may rely on engine operation, which may be limited in the case of hybrid electric vehicles (HEVs), start/stop (S/S) vehicles, etc., thus decreasing opportunities for humidity sensor diagnostic tests.

Thus, the inventors herein have developed systems and methods to at least partially address the above-mentioned issues. In one example, a method is provided comprising obtaining a baseline humidity measurement via a humidity sensor positioned in an intake system of an engine, while rotating the engine unfueled in a reverse direction, injecting a fluid into an exhaust system coupled to the engine which is drawn by the engine into the intake system, and rationalizing the humidity sensor as a function of a humidity measurement of the injected fluid by the humidity sensor and the baseline humidity measurement. In this way, the humidity sensor may be rationalized while the engine is not being fueled, which may improve fuel economy and may result in an increased lifetime of the engine.

In one example, the fluid comprises diesel exhaust fluid.

In an example, obtaining the baseline humidity measurement comprises commanding a throttle positioned in the intake system to a predetermined open position to couple the intake system and humidity sensor to atmosphere just prior to rotating the engine unfueled in the reverse direction. In such an example, obtaining the baseline humidity measurement and rationalizing the humidity sensor via rotating the engine unfueled in reverse and injecting the fluid into the exhaust may be commenced responsive to a predetermined duration of time elapsing since a vehicle-off event, where rationalizing the humidity sensor is requested during the vehicle-off event.

In some examples, rotating the engine in reverse is conducted at a predetermined engine speed, and may further include rotating the engine in reverse for a predetermined duration which comprises an amount of time where a response from the humidity sensor is expected provided that the humidity sensor is functioning as desired, without routing the fluid to atmosphere.

In another example, rationalizing the humidity sensor further comprises indicating that the humidity sensor is functioning as desired responsive to the humidity sensor outputting a signal that is greater than a threshold amount above the baseline humidity measurement, and indicating that the humidity sensor is not functioning as desired responsive to the humidity sensor outputting a signal that is lower than the threshold amount above the baseline humidity measurement.

In still another example, such a method may further include responsive to rationalizing the humidity sensor, rotating the engine unfueled in a forward direction, to route the fluid from the intake system back into the exhaust system.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 4:
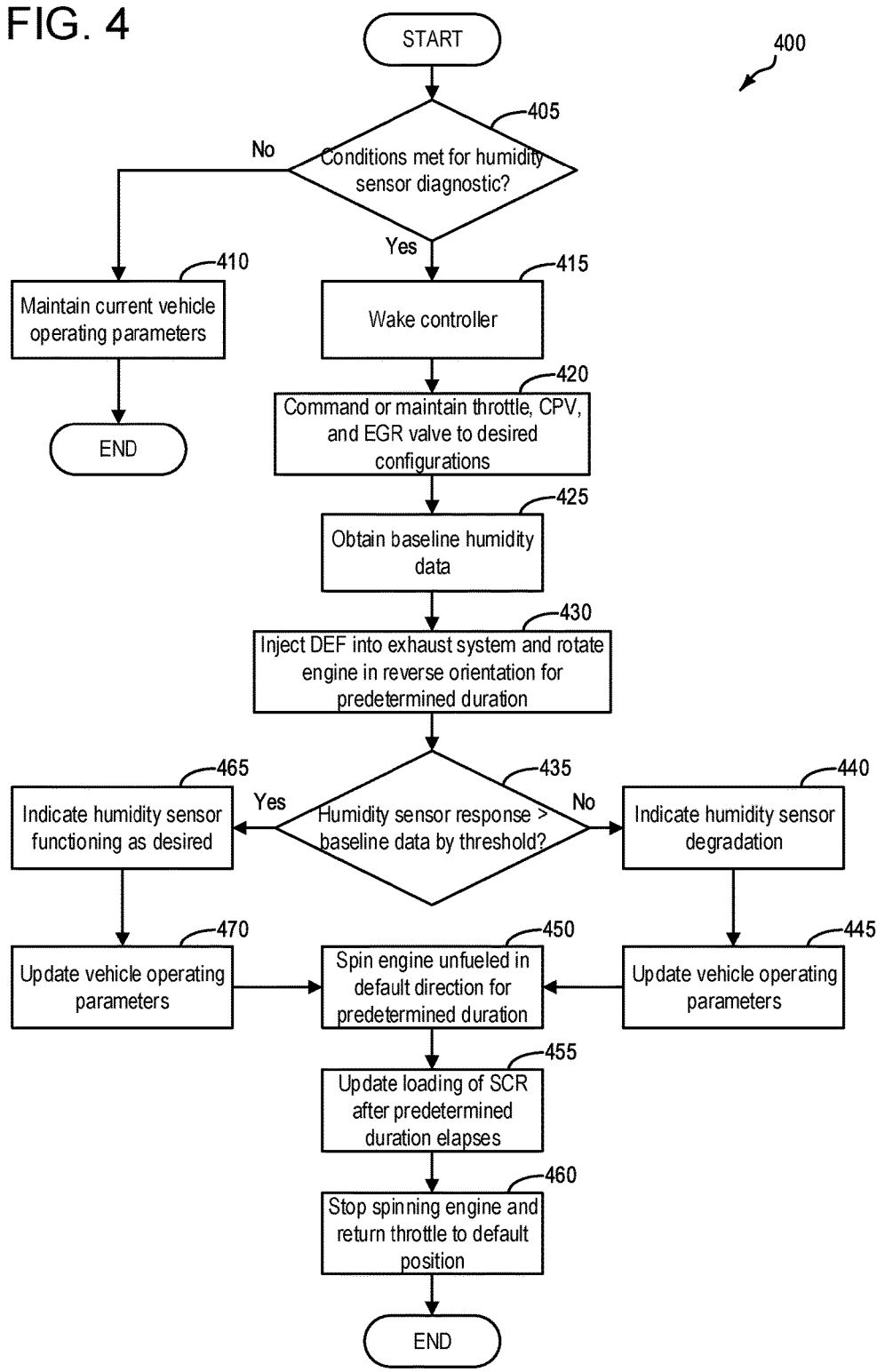
FIG. 4 shows a high-level flowchart for conducting a humidity sensor diagnostic and for loading an SCR catalyst.
Figure 5:
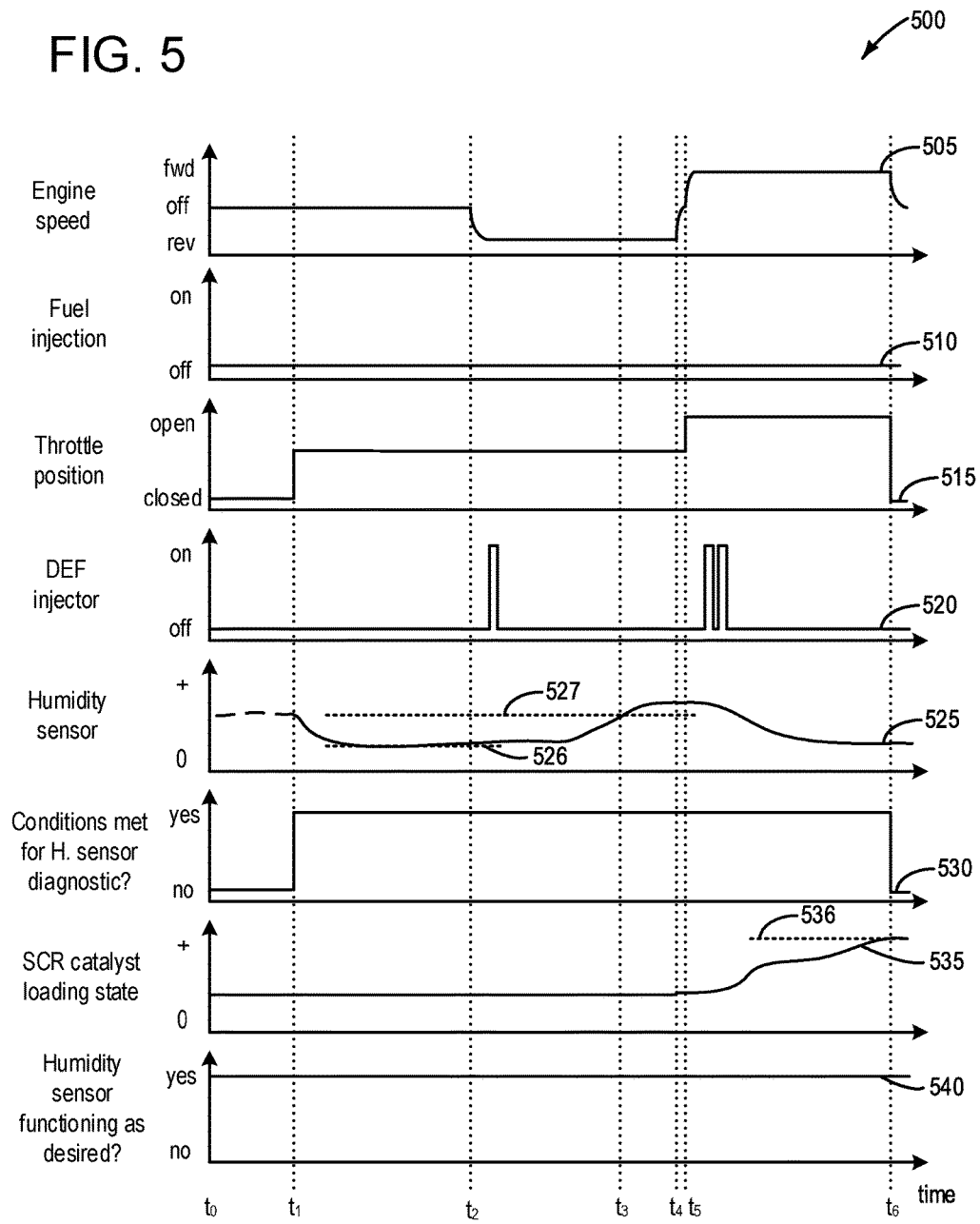
FIG. 5 shows an example timeline for conducting a humidity sensor diagnostic and for loading an SCR catalyst, according to the method of FIG. 4.

The following description relates to systems and methods for conducting a humidity sensor diagnostic, in order to rationalize a humidity sensor positioned in an intake system of a vehicle. Such a humidity sensor diagnostic may comprise obtaining a baseline humidity sensor value or measurement, and then obtaining a test humidity measurement subsequent to obtaining the baseline humidity measurement. The test humidity measurement may be carried out under conditions where humidity in the vicinity of the humidity sensor may be expected to change. More specifically, to obtain the test humidity measurement, a solution of diesel exhaust fluid (DEF) may be injected into an exhaust system upstream of an SCR catalyst, and the engine may be rotated or spun unfueled in a reverse orientation in order to route the DEF (which contains water) to the intake system in order to rationalize the humidity sensor. Such a method may be carried out in a hybrid vehicle capable of rotating the engine unfueled via a motor, such as the hybrid vehicle depicted at FIG. 1. The humidity sensor may be positioned in an intake system of an engine, where a DEF injector may enable DEF to be injected upstream of the SCR catalyst, as illustrated in FIG. 2. An H-bridge circuit may be utilized to enable the engine to be rotated in the forward or reverse direction, illustrated at FIGS. 3A-3B. A method for conducting the humidity sensor diagnostic, is illustrated at FIG. 4. Subsequent to rationalizing the humidity sensor by rotating the engine in reverse, the engine may be rotated in the forward direction, to route the DEF in the intake system back to the exhaust system. The DEF being routed to the exhaust system may serve to populate or load the SCR catalyst with ammonia, such that the SCR catalyst is loaded and ready for a subsequent engine start event (e.g. engine cold start), which may reduce undesired emissions (e.g. $NO_x$). An example timeline for conducting the humidity sensor diagnostic and for loading the SCR catalyst using DEF injected for the purpose of conducting the humidity sensor diagnostic, is illustrated at FIG. 5.

Figure 1:
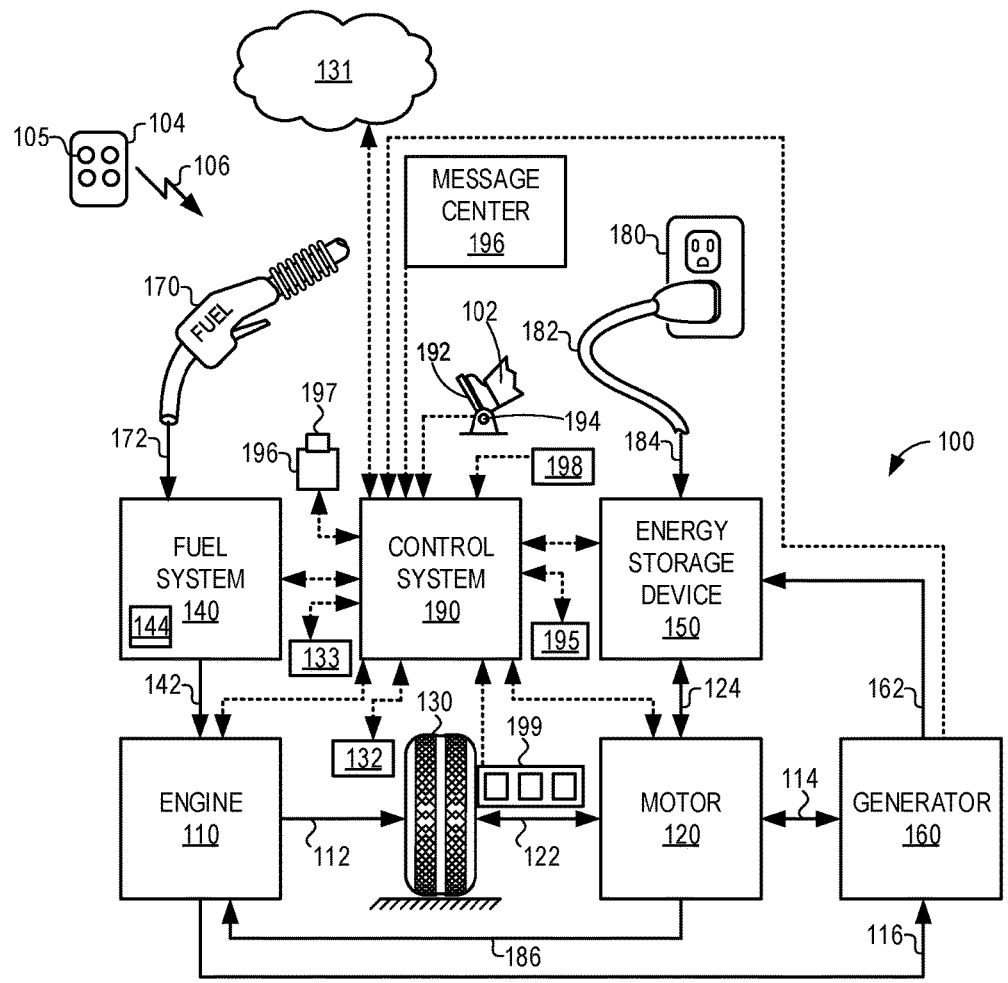
FIG. 1 schematically shows an example vehicle propulsion system.
Figure 2:
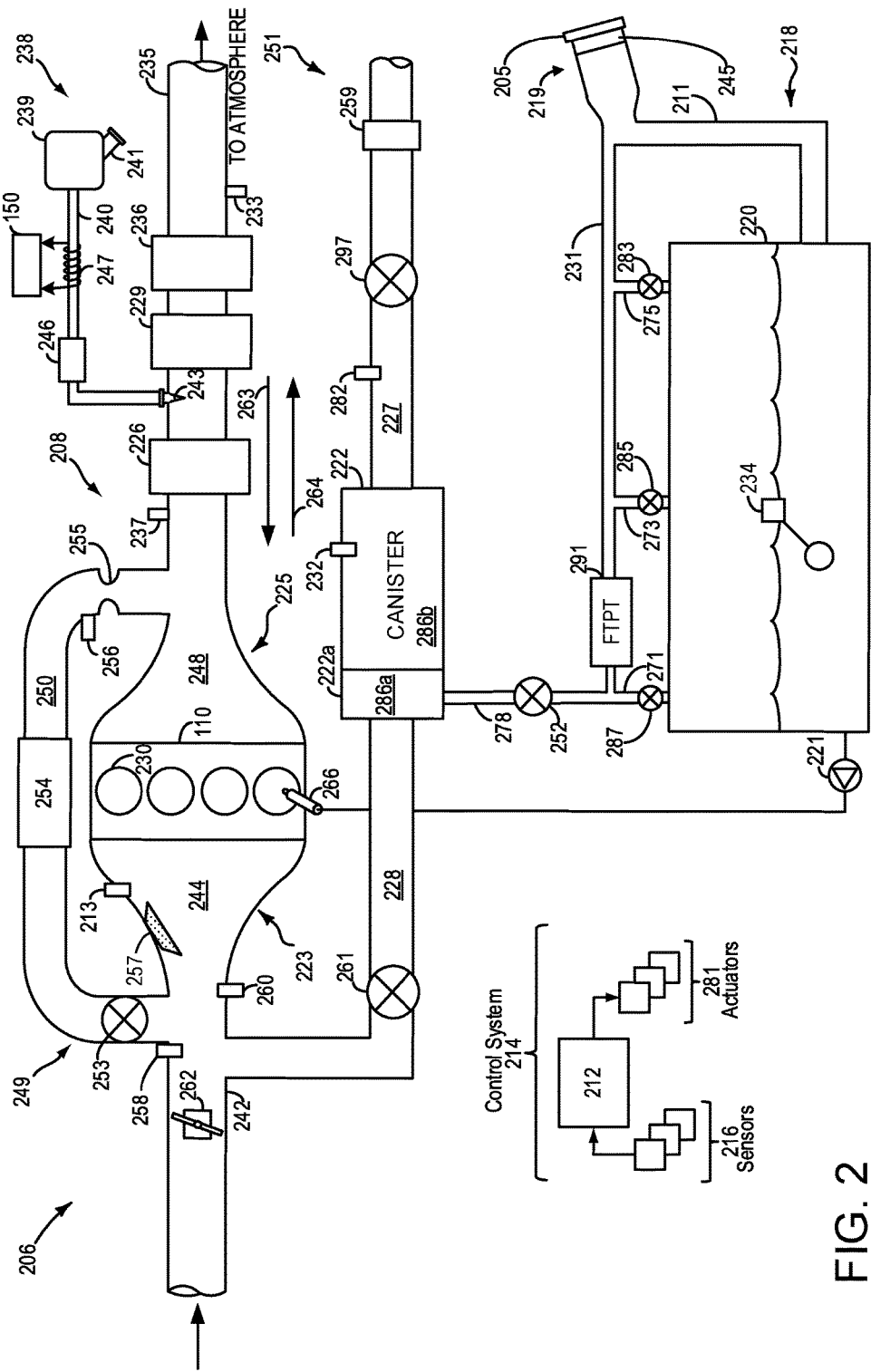
FIG. 2 schematically shows an example vehicle system with a fuel system and an evaporative emissions system.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e., set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some examples. However, in other examples, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some examples, motor 120 may propel the vehicle via a first set of drive wheels and engine 110 may propel the vehicle via a second set of drive wheels.

In other examples, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

In still other examples, which will be discussed in further detail below, motor 120 may be configured to rotate engine unfueled in a forward (e.g. default orientation) or reverse orientation, using energy provided via energy storage device 150, exemplified by arrow 186.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some examples, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal. Furthermore, in some examples control system 190 may be in communication with a remote engine start receiver 195 (or transceiver) that receives wireless signals 106 from a key fob 104 having a remote start button 105. In other examples (not shown), a remote engine start may be initiated via a cellular telephone, or smartphone based system where a user's cellular telephone sends data to a server and the server communicates with the vehicle to start the engine.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other examples, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some examples, fuel tank 144 may be configured to store the fuel received from fuel dispensing device 170 until it is supplied to engine 110 for combustion. In some examples, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed.

Control system 190 may be communicatively coupled to other vehicles or infrastructures using appropriate communications technology, as is known in the art. For example, control system 190 may be coupled to other vehicles or infrastructures via a wireless network 131, which may comprise Wi-Fi, Bluetooth, a type of cellular service, a wireless data transfer protocol, and so on. Control system 190 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I or V2X) technology. The communication and the information exchanged between vehicles can be either direct between vehicles, or can be multi-hop. In some examples, longer range communications (e.g. WiMax) may be used in place of, or in conjunction with, V2V, or V2I2V, to extend the coverage area by a few miles. In still other examples, vehicle control system 190 may be communicatively coupled to other vehicles or infrastructures via a wireless network 131 and the internet (e.g. cloud), as is commonly known in the art.

Vehicle system 100 may also include an on-board navigation system 132 (for example, a Global Positioning System) that an operator of the vehicle may interact with. The navigation system 132 may include one or more location sensors for assisting in estimating vehicle speed, vehicle altitude, vehicle position/location, etc. This information may be used to infer engine operating parameters, such as local barometric pressure. As discussed above, control system 190 may further be configured to receive information via the internet or other communication networks. Information received from the GPS may be cross-referenced to information available via the internet to determine local weather conditions, local vehicle regulations, etc.

FIG. 2 shows a schematic depiction of a vehicle system 206. It may be understood that vehicle system 206 may comprise the same vehicle system as vehicle system 100 depicted at FIG. 1. The vehicle system 206 includes an engine system 208 coupled to an emissions control system 251 and a fuel system 218. It may be understood that fuel system 218 may comprise the same fuel system as fuel system 140 depicted at FIG. 1. Emission control system 251 includes a fuel vapor container or canister 222 which may be used to capture and store fuel vapors. The engine system 208 may include an engine 110 having a plurality of cylinders 230. The engine 110 includes an engine air intake system 223 and an engine exhaust system 225. The engine air intake 223 includes a throttle 262 in fluidic communication with engine intake manifold 244 via an intake passage 242. Further, engine air intake 223 may include an air box and filter (not shown) positioned upstream of throttle 262. The engine exhaust system 225 includes an exhaust manifold 248 leading to an exhaust passage 235 that routes exhaust gas to the atmosphere. The exhaust passage may lead to one or more exhaust after-treatment devices (e.g. 226, 229, 236), as well as a reductant delivery and storage system, such as diesel exhaust fluid (DEF) system 238.

The exhaust after-treatment devices may be disposed in various orders and/or combinations along exhaust passage 235. For example, a diesel oxidation catalyst (DOC) 226 may be followed downstream by a selective catalytic reduction (SCR) catalyst 229. SCR catalyst 229 may be followed downstream by a diesel particulate filter (DPF) 236. It should be understood that the emissions control devices of the exhaust system 225 shown in FIG. 2 are exemplary in nature. Various other emission control devices and configurations may be included in engine exhaust system 225. For example, exhaust system 225 may include an SCR catalyst followed by a DPF only. In another example, the exhaust system 225 may only include an SCR catalyst. In still another example, a DPF may be located upstream of the SCR catalyst, or a combined DPF/SCR catalyst may be used.

The engine exhaust system 225 may further include a reductant delivery and/or storage system, such as DEF system 238. The DEF may be a liquid reductant, such as a urea and water mixture, stored in a storage vessel, such as a storage tank. In one example, the DEF system 238 may include DEF tank 239 for onboard DEF storage, a DEF delivery line 240 that couples the DEF tank 239 to exhaust passage 235 via an injector at or upstream of SCR catalyst 229. The DEF tank 239 may be of various forms, and may include a filler neck 241 and corresponding cap and/or cover door in the vehicle body. Filler neck 241 may be configured to receive a nozzle for replenishing DEF.

DEF system 238 may also include a DEF injector 243 in line 240 which injects DEF into the exhaust upstream of the SCR catalyst 229. DEF injector 243 may be used to control the timing and amount of DEF injections, via control system 214. DEF system 238 may further include DEF pump 246. DEF pump 246 may be used to pressurize and deliver DEF into line 240. DEF system 238 may further include a DEF line heater 247 which heats DEF line 240. For example, the DEF line heater 247 may warm the DEF fluid on the way to the DEF pump at low temperatures in order to maintain a DEF fluid viscosity. DEF line heater 247 may be a resistive heater, or various other configurations. DEF line heater 247 may be coupled to energy storage device 150, which may include a battery, and may be enabled and controlled via control system 214, for example.

It will be appreciated that other components may be included in the engine such as a variety of valves and sensors. For example, a barometric pressure sensor 213 may be included in the engine intake. In one example, barometric pressure sensor 213 may be a manifold air pressure (MAP) sensor and may be coupled to the engine intake downstream of throttle 262. Barometric pressure sensor 213 may rely on part throttle or full or wide open throttle conditions, e.g., when an opening amount of throttle 262 is greater than a threshold, in order accurately determine BP.

A humidity sensor 258 may be positioned in the engine air intake, downstream of throttle 262. The humidity sensor may be positioned to determine the humidity of intake air flowing through intake passage 242, for example. In an example, humidity sensor 258 may measure the relative humidity and temperature of gas that the sensor is exposed to. Based on the relative humidity and temperature, the specific humidity of the gas may be determined (e.g. the amount of water per unit mass of gas flow). To measure the relative humidity, a dew point sensor (using a chilled mirror, for example) or a wet bulb/dry bulb sensor may be used. In other examples, the absolute humidity may be measured by a capacitance sensor, and the temperature and/or pressure of the air may be estimated or measured in order to calculate the relative and/or specific humidity.

In particular, engine control systems tend to want to know the specific humidity, for example the humidity ratio of the air. In other words, the engine control system wants to know how much of the air is water vapor (or some other diluent). Some engine humidity sensors measure the absolute humidity, for example the mass of water in a volume of air. In many cases, a humidity sensor may measure absolute humidity, convert it to relative humidity via selected measurements and assumptions, send the relative humidity data to the controller 212 which reconverts to absolute humidity, and then converts to specific humidity. To make such conversions, both pressure and temperature at the point of measurement may be measured or inferred. Accordingly, in some examples, barometric pressure sensor 213 and temperature sensor 260 may be included in close proximity to humidity sensor 258.

The humidity sensor is used inside the engine intake system for engine control purposes. Thus, to ensure that the humidity sensor is functioning as desired, such a sensor may be rationalized via a humidity sensor diagnostic. In some examples, a humidity sensor may be rationalized or diagnosed by comparing its response to that of another downstream humidity sensor, or an oxygen sensor downstream of the humidity sensor. However, such diagnostic strategies may be problematic in that humidity may differ between two or more sensors. For example, humidity may exist in the intake manifold, while not necessarily in the exhaust manifold.

Furthermore, there may be many noise factors that may result in such a diagnostic being challenging to interpret. Examples include incomplete combustion, exhaust temperature, presence of degradation stemming from the intake manifold, exhaust manifold, etc. Other attempts, such as rationalizing the humidity sensor via weather cloud data also poses challenges to interpretation, as humidity may be local and weather map data may be insufficient for such a diagnostic.

Still further, some vehicles such as HEVs, PHEVs, S/S, etc., may have limited engine run time, and thus attempting to utilize downstream exhaust gas sensors or other methods may be futile without significant engine run time. Thus, a more robust humidity sensor test diagnostic is desired, which is the focus of this application, and which will be discussed in further detail below and with regard to FIGS. 4-5.

Engine system 208 may also include an exhaust gas recirculation (EGR) system 249 that receives a portion of an exhaust gas stream exiting engine 110 and returns the exhaust gas to engine intake manifold 244 downstream of throttle 262. Under some conditions, EGR system 249 may be used to regulate the temperature and/or dilution of the air and fuel mixture within the combustion chamber, thus providing a method of controlling the timing of ignition during some combustion modes. Further, during some conditions, a portion of combustion gases may be retained or trapped in the combustion chamber by controlling exhaust valve timing. EGR system 249 is shown forming a common EGR passage 250 from exhaust passage 235 to intake passage 242.

In some examples, exhaust system 225 may also include a turbocharger (not shown) comprising a turbine and a compressor coupled on a common shaft. The turbine may be coupled within exhaust passage 235, while the compressor may be coupled within intake passage 242. Blades of the turbine may be caused to rotate about the common shaft as a portion of the exhaust gas stream discharged from the engine 110 impinges upon the blades of the turbine. The compressor may be coupled to the turbine such that the compressor may be actuated when the blades of the turbine are caused to rotate. When actuated, the compressor may then direct pressurized fresh air to air intake manifold 244 where it may then be directed to engine 110. In systems where EGR passage 250 is coupled to engine exhaust 225 upstream of the turbine and coupled to intake passage 242 downstream of the compressor, the EGR system may be considered a high pressure EGR system. The EGR passage may alternatively be coupled downstream of the turbine and upstream of the compressor (low pressure EGR system).

An EGR valve 253 may be coupled within EGR passage 250. EGR valve 253 may be configured as an active solenoid valve that may be actuated to allow exhaust gas flow into intake manifold 244. The portion of the exhaust gas flow discharged by engine 110 that is allowed to pass through EGR system 249 and return to engine 110 may be metered by the measured actuation of EGR valve 253, which may be regulated by controller 212. The actuation of EGR valve 253 may be based on various vehicle operating parameters and a calculated overall EGR flow rate.

One or more EGR coolers 254 may be coupled within EGR passage 250. EGR cooler 254 may act to lower the overall temperature of the EGR flow stream before passing the stream on to intake manifold 244 where it may be combined with fresh air and directed to engine 110. EGR passage 250 may include one or more flow restriction regions 255. One or more pressure sensors 256 may be coupled at or near flow restriction region 255. The diameter of the flow restriction region ma thus be used to determine an overall volumetric flow rate through EGR passage 250.

An air intake system hydrocarbon trap (AIS HC) 257 may be placed in the intake manifold of engine 110 to adsorb fuel vapors emanating from unburned fuel in the intake manifold, puddled fuel from degraded fuel injectors and/or fuel vapors in crankcase ventilation emissions during engine-off periods. The AIS HC may include a stack of consecutively layered polymeric sheets impregnated with HC vapor adsorption/desorption material. Alternately, the adsorption/desorption material may be filled in the area between the layers of polymeric sheets. The adsorption/desorption material may include one or more of carbon, activated carbon, zeolites, or any other HC adsorbing/desorbing materials. When the engine is operational causing an intake manifold vacuum and a resulting airflow across the AIS HC 257, the trapped vapors may be passively desorbed from the AIS HC and combusted in the engine 110. Thus, during engine operation, intake fuel vapors are stored and desorbed from AIS HC 257. In addition, fuel vapors stored during an engine shutdown can also be desorbed from the AIS HC during engine operation. In this way, AIS HC 257 may be continually loaded and purged, and the trap may reduce evaporative emissions from the intake passage even when engine 110 is shut down.

Fuel system 218 may include a fuel tank 220 coupled to a fuel pump system 221. It may be understood that fuel tank 220 may comprise the same fuel tank as fuel tank 144 depicted above at FIG. 1. The fuel pump system 221 may include one or more pumps for pressurizing fuel delivered to the injectors of engine 110, such as the example injector 266 shown. While only a single injector 266 is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed to an evaporative emissions control system 251 which includes a fuel vapor canister 222 via vapor recovery line 231, before being purged to the engine air intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves may be positioned in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 220 via a fuel filler pipe or neck 211.

Further, refueling system 219 may include refueling lock 245. In some examples, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some examples, refueling lock 245 may be a filler pipe valve located at a mouth of fuel filler pipe 211. In such examples, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some examples, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In examples where refueling lock 245 is locked using an electrical mechanism, refueling lock 245 may be unlocked by commands from controller 212, for example, when a fuel tank pressure decreases below a pressure threshold. In examples where refueling lock 245 is locked using a mechanical mechanism, refueling lock 245 may be unlocked via a pressure gradient, for example, when a fuel tank pressure decreases to atmospheric pressure.

Emissions control system 251 may include one or more emissions control devices, such as one or more fuel vapor canisters 222 filled with an appropriate adsorbent 286b, the canisters are configured to temporarily trap fuel vapors (including vaporized hydrocarbons) during fuel tank refilling operations and "running loss" (that is, fuel vaporized during vehicle operation). In one example, the adsorbent 286b used is activated charcoal. Emissions control system 251 may further include a canister ventilation path or vent line 227 which may route gases out of the canister 222 to the atmosphere when storing, or trapping, fuel vapors from fuel system 218.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent 286a in the buffer 222a may be same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors 232 may be coupled to and/or within canister 222. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

In some examples, the flow of air and vapors between canister 222 and the atmosphere may be regulated by a canister vent valve 297 coupled within vent line 227. When included, the canister vent valve 297 may be a normally open valve, so that fuel tank isolation valve 252 (FTIV) may control venting of fuel tank 220 with the atmosphere. FTIV 252 may be positioned between the fuel tank and the fuel vapor canister 222 within conduit 278. FTIV 252 may be a normally closed valve, that when opened, allows for the venting of fuel vapors from fuel tank 220 to fuel vapor canister 222. Fuel vapors may then be vented to atmosphere, or purged to engine intake system 223 via canister purge valve 261. As will be discussed in detail below, in some example the FTIV may not be included, whereas in other examples, an FTIV may be included. Accordingly, the use of an FTIV will be discussed with regard to the methods described below, where relevant.

Fuel system 218 may be operated by controller 212 in a plurality of modes by selective adjustment of the various valves and solenoids. It may be understood that control system 214 may comprise the same control system as control system 190 depicted above at FIG. 1. For example, the fuel system may be operated in a fuel vapor storage mode (e.g., during a fuel tank refueling operation and with the engine not combusting air and fuel), wherein the controller 212 may open isolation valve 252 (when included) while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open isolation valve 252 (when included), while maintaining canister purge valve 261 closed, to depressurize the fuel tank before allowing enabling fuel to be added therein. As such, isolation valve 252 (when included) may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine combusting air and fuel), wherein the controller 212 may open canister purge valve 261 while closing isolation valve 252 (when included). Herein, the vacuum generated by the intake manifold of the operating engine may be used to draw fresh air through vent 227 and through fuel vapor canister 222 to purge the stored fuel vapors into intake manifold 244. In this mode, the purged fuel vapors from the canister are combusted in the engine. The purging may be continued until the stored fuel vapor amount in the canister is below a threshold.

Controller 212 may comprise a portion of a control system 214. In some examples, control system 214 may be the same as control system 190, illustrated in FIG. 1. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device 270, temperature sensor 233, pressure sensor 291, pressure sensor 282, and canister temperature sensor 232. Other sensors such as pressure, temperature, air/fuel ratio, and composition sensors may be coupled to various locations in the vehicle system 206. As another example, the actuators may include throttle 262, fuel tank isolation valve 252, canister purge valve 261, and canister vent valve 297. The control system 214 may include a controller 212. The controller may receive input data from the various sensors, process the input data, and trigger the actuators in response to the processed input data based on instruction or code programmed therein corresponding to one or more routines. Example control routines are described herein with regard to FIG. 4.

In some examples, the controller may be placed in a reduced power mode or sleep mode, wherein the controller maintains essential functions only, and operates with a lower battery consumption than in a corresponding awake mode. For example, the controller may be placed in a sleep mode following a vehicle-off event in order to perform a diagnostic routine at a duration after the vehicle-off event. The controller may have a wake input that allows the controller to be returned to an awake mode based on an input received from one or more sensors. For example, the opening of a vehicle door may trigger a return to an awake mode. In other examples, the controller may need to be awake in order to conduct such methods. In such an example, the controller may stay awake for a duration referred to as a time period where the controller is maintained awake to perform extended shutdown functions, such that the controller may be awake to conduct diagnostic routines. In another example, a wakeup capability may enable a circuit to wake the controller when a diagnostic is requested (e.g. when a humidity sensor diagnostic is requested, or when conditions are met for conducting such a diagnostic).

Undesired evaporative emissions detection routines may be intermittently performed by controller 212 on fuel system 218 and/or evaporative emissions system 251 to confirm that undesired evaporative emissions are not present in the fuel system and/or evaporative emissions system. As such, evaporative emissions detection routines may be performed while the engine is off (engine-off test) using engine-off natural vacuum (EONV) generated due to a change in temperature and pressure at the fuel tank following engine shutdown and/or with vacuum supplemented from a vacuum pump. Alternatively, evaporative emissions detection routines may be performed while the engine is running by operating a vacuum pump and/or using engine intake manifold vacuum. In some configurations, a canister vent valve (CVV) 297 may be coupled within vent line 227. CVV 297 may function to adjust a flow of air and vapors between canister 222 and the atmosphere. The CVV may also be used for diagnostic routines. When included, the CVV may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the CVV may be opened to allow a flow of fresh air to strip the fuel vapors stored in the canister. In some examples, CVV 297 may be a solenoid valve wherein opening or closing of the valve is performed via actuation of a canister vent solenoid. In particular, the canister vent valve may be an open that is closed upon actuation of the canister vent solenoid. In some examples, CVV 297 may be configured as a latchable solenoid valve. In other words, when the valve is placed in a closed configuration, it latches closed without requiring additional current or voltage. For example, the valve may be closed with a 100 ms pulse, and then opened at a later time point with another 100 ms pulse. In this way, the amount of battery power required to maintain the CVV closed is reduced. In particular, the CVV may be closed while the vehicle is off, thus maintaining battery power while maintaining the fuel emissions control system sealed from atmosphere.

When the engine is spun in the default direction, a vacuum is generated in the intake manifold, while a pressure is generated in the exhaust system. However, if the engine is spun in reverse, a vacuum is generated in the exhaust system, while a pressure is generated in the intake manifold. More specifically, as the engine spins in reverse, the opening of a cylinder exhaust valve (not shown) brings fresh air (and exhaust gas if present) into the cylinder, and a subsequent opening of the cylinder intake valve (not shown) evacuates the cylinder to the intake manifold.

A vehicle such as the vehicle propulsion system 100 described above comprises a hybrid electric vehicle, and as such, the vehicle motor (e.g. 120) may be utilized to spin or rotate the engine unfueled using power supplied via the energy storage device (e.g. 150), such as a battery. In some examples, which will be discussed in further detail below, it may be desired to spin the engine in a reverse orientation (opposite that of the default direction). For example, in order to rationalize the humidity sensor (e.g. 258), DEF may be injected into the exhaust manifold, where spinning the engine in reverse may draw the DEF into the intake, in the direction illustrated by arrow 263, where the humidity sensor may respond due to the DEF comprising a 32.5% UREA and 67.5% deionized water. More specifically, the water content in the injected DEF may result in a response in the humidity sensor (e.g. 258), under conditions where the humidity sensor is functioning as desired.

Subsequent to routing the DEF into the intake manifold, the engine may be spun or rotated unfueled in the forward, or default, direction for a predetermined duration. While the engine is being rotated in the forward direction, the DEF that was routed to the intake manifold may be re-rerouted back to the exhaust system, exemplified by arrow 264. As will be discussed in further detail below, routing DEF back into the exhaust system may serve to populate the SCR catalyst (e.g. 229) with ammonia. In this way, the injected DEF may ensure that the SCR catalyst is primed for an engine start event, such that undesired emissions may be reduced or avoided. In some examples, depending on a loading state and a desired loading state of the SCR catalyst as indicated via a model, one or more additional injections of DEF may be conducted during the rotating the engine unfueled in the forward direction. A method for conducting such a humidity sensor diagnostic will be discussed in detail below with regard to FIG. 4.

Figure 3A:
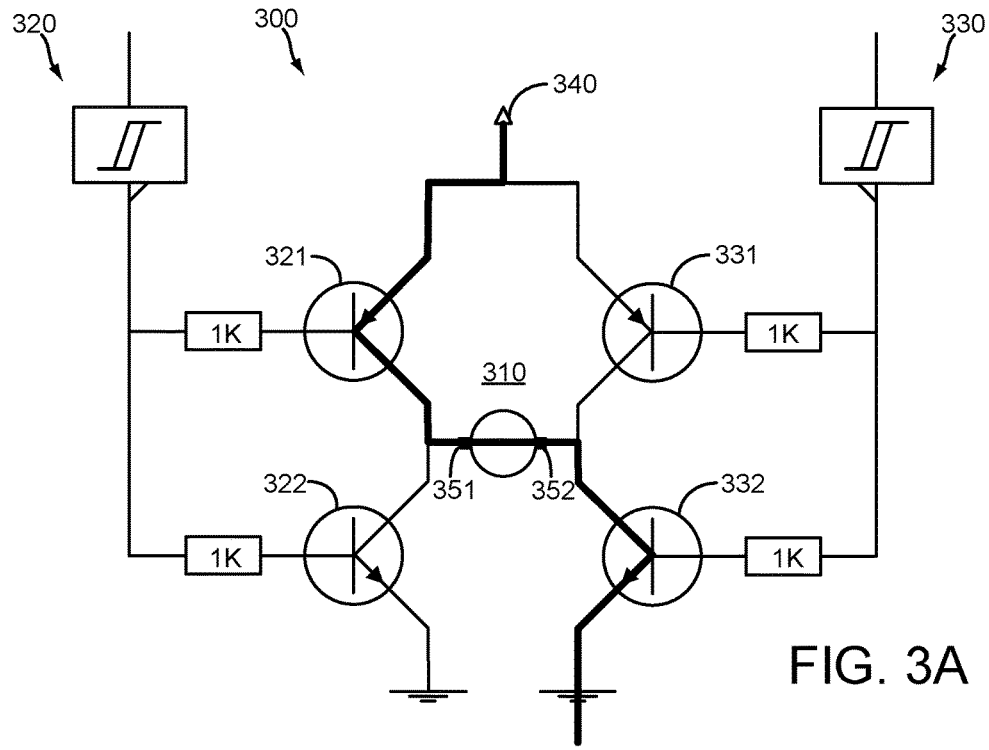
FIGS. 3A-3B schematically shows an example H-bridge circuit which may be used to rotate a vehicle engine in a forward or reverse direction.
Figure 3B:
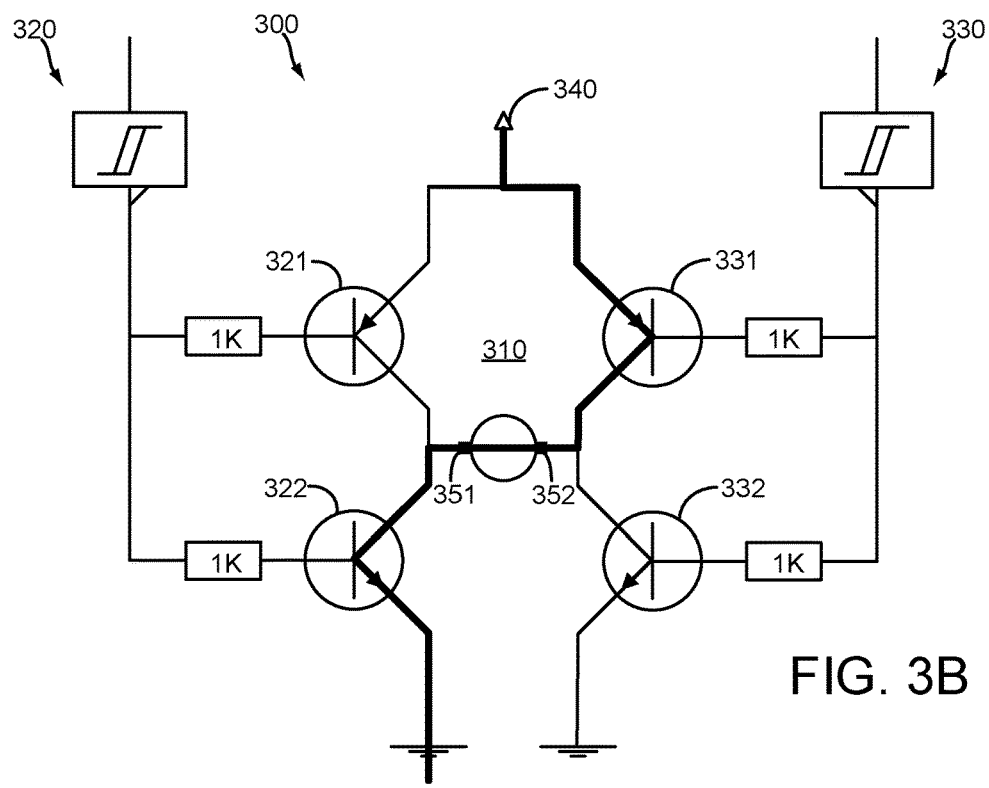

FIGS. 3A and 3B show an example circuit 300 that may be used for reversing a spin orientation of an electric motor. Circuit 300 schematically depicts an H-Bridge circuit that may be used to run a motor 310 in a first (forward) direction and alternately in a second (reverse) direction. Circuit 300 comprises a first (LO) side 320 and a second (HI) side 330. Side 320 includes transistors 321 and 322, while side 330 includes transistors 331 and 332. Circuit 300 further includes a power source 340.

In FIG. 3A, transistors 321 and 332 are activated (energized), while transistors 322 and 331 are off. In this confirmation, the left lead 351 of motor 310 is connected to power source 340, and the right lead 352 of motor 310 is connected to ground. In this way, motor 300 may run in a forward direction. When operating the engine in a forward direction via the motor, the engine may be in a cranking mode for initial combustion commencement. Additionally and/or alternatively, when operating the engine in a forward direction via the motor, the engine (and motor or another motor) may be in a drive mode to drive the vehicle. It may be understood that in some examples, the engine may be spun in the forward (e.g. default) direction under conditions where the vehicle is stationary and it is desired only for the engine to be spun or rotated in the forward direction, without combustion.

In FIG. 3B, transistors 322 and 331 are activated (energized), while transistors 321 and 332 are off. In this confirmation, the right lead 352 of motor 310 is connected to power source 340, and the left lead 351 of motor 310 is connected to ground. In this way, motor 310 may run in a reverse direction.

Thus, a system for a vehicle may comprise an engine system including an intake system, exhaust system, and engine, a diesel exhaust fluid injection system configured to inject a diesel exhaust fluid into the exhaust system upstream of a selective catalytic reduction catalyst, a motor configured to at least rotate the engine unfueled via power from a battery, a humidity sensor positioned in the intake system, and a controller storing instructions in non-transitory memory that, when executed, cause the controller to: responsive to conditions being met for conducting a humidity sensor diagnostic test, rotate the engine unfueled in reverse at a predetermined engine speed for a predetermined duration via the motor, inject a predetermined amount of diesel exhaust fluid into the exhaust system where the rotating the engine unfueled in reverse draws the diesel exhaust fluid into the intake system to rationalize the humidity sensor. Such a system may further include additional instructions to, subsequent to rotating the engine unfueled in reverse for the predetermined duration, stop the rotating the engine unfueled in reverse and commence rotating the engine unfueled in a forward direction for a predetermined duration via the motor, to route the diesel exhaust fluid back to the exhaust system in order to load the selective catalytic reduction catalyst with ammonia, and where conditions being met include at least a predetermined vehicle-off duration.

Such a system may further comprise a throttle positioned in the intake system upstream of the humidity sensor, and wherein the controller stores additional instructions to obtain a baseline humidity measurement from the humidity sensor just prior to rotating the engine unfueled in reverse by commanding the throttle to a predetermined open position to couple the intake system to atmosphere. The system may maintain the throttle at the predetermined open position or a fully open position during the rotating the engine unfueled in reverse, and may command or maintain the throttle to the fully open position just prior to rotating the engine unfueled in the forward direction, where rationalizing the humidity sensor includes indicating that the humidity sensor is functioning as desired responsive to a humidity measurement during the rotating the engine unfueled in reverse being greater than the baseline humidity measurement by at least a threshold amount.

For such a system, the diesel exhaust fluid may comprise a mixture of urea and water, where the water may stimulate the humidity sensor to rationalize the humidity sensor, and where the urea may be converted to ammonia at the selective catalytic reduction catalyst.

Such a system may further comprise an exhaust gas recirculation system selectively coupled to the engine system via an exhaust gas recirculation valve, an evaporative emissions system selectively coupled to the engine system via a canister purge valve, and the controller may store additional instructions to command both the exhaust gas recirculation valve and the canister purge valve to closed positions during the rotating the engine unfueled in both the forward and reverse directions.

Turning now to FIG. 4, a high-level example method 400 for conducting a humidity sensor diagnostic on a humidity sensor positioned in an engine intake system of a vehicle, is shown. More specifically, method 400 may include injection of a diesel exhaust fluid (DEF) into an exhaust system upstream of an SCR catalyst, and may further include rotating or spinning an engine in a reverse orientation (compared to a default, or forward direction) in order to route the DEF into the intake system of the engine. In cases where the humidity sensor is functioning as desired, the humidity sensor may output a response greater than a threshold response over a baseline humidity measurement. However, if the humidity sensor is not functioning as desired, the humidity sensor may not respond, or any response may be below the threshold response over the baseline humidity measurement. Subsequent to assessing the functionality of the humidity sensor, the engine may be spun or rotated in the forward direction, to direct the DEF back into the exhaust system, where it may serve to populate the SCR catalyst with ammonia, for subsequent engine startup event. In this way, a vehicle intake humidity sensor may be diagnosed via the water content of the DEF, as one commonly used DEF comprises 32.5% UREA and 67.5% deionized water, and furthermore the injection of DEF may additionally populate the SCR catalyst in the exhaust system, subsequent to diagnosing the humidity sensor.

Method 400 will be described with reference to the systems described herein and shown in FIGS. 1-2, though it should be understood that similar methods may be applied to other systems without departing from the scope of this disclosure. Method 400 may be carried out by a controller, such as controller 212 in FIG. 2, and may be stored at the controller as executable instructions in non-transitory memory. Instructions for carrying out method 400 and the rest of the methods included herein may be executed by the controller based on instructions stored on a memory of the controller and in conjunction with signals received from sensors of the engine system, such as the sensors described above with reference to FIGS. 1-2. The controller may employ engine system actuators, such as motor (e.g. 120), throttle (e.g. 262), canister purge valve (e.g. 261), EGR valve (e.g. 253), DEF injector (e.g. 243), DEF pump (e.g. 246), DEF heater (e.g. 247), etc., according to the method below.

Method 400 begins at 405, and may include indicating whether conditions are met for conducting a humidity sensor diagnostic. Conditions being met for conducting the humidity sensor diagnostic may include a predetermined amount of time elapsing since a prior humidity sensor diagnostic, in one example. The predetermined amount of time may include less than two days, two days, three days, greater than three days but less than 8 days, greater than 8 days but less than 12 days, etc.

In some examples conditions being met at 405 may additionally or alternatively include an indication that the humidity sensor (e.g. 258) is not functioning as desired. Examples may include a situation where the vehicle controller (e.g. 212) may monitor variation in an output signal from the humidity sensor during a transient time period such as an engine cold start, to indicate if the sensor is outputting a changing humidity as expected. In some examples, the controller may additionally or alternatively compare humidity sensor output signals and measurements across a number of prior drive cycles and different days of operation of the vehicle in order to indicate with a certain probability that the humidity sensor may not be functioning as desired. Other examples may include the vehicle controller comparing output signals from the humidity sensor to humidity readings obtained from a source external to the vehicle, such as regional or local weather reports (obtained via communication with the internet, for example) or forecast from a satellite of other weather broadcast. Still other examples may include comparison of the vehicle's humidity sensor output with one or more other vehicle or infrastructure humidity sensors, where such data may be acquired via V2V (vehicle-to-vehicle) or V2X (vehicle-to-infrastructure) communications, etc. In such examples, the humidity external to the vehicle may comprise a humidity that may be indicative of the humidity as sensed by the vehicle humidity sensor (e.g. 258), for example. Thus, such comparisons of vehicle humidity sensor measurements with an external humidity sensor may be restricted to external humidity sensor measurements within a predetermined radius or specified distance from the vehicle.

In still further examples, conditions being met at 405 may additionally or alternatively include an indication that a soak-time, or vehicle-off duration of time since a key-off event, is greater than a threshold soak-time duration. For examples, such a threshold soak-time duration may comprise 2 hours, between 2 hours and 4 hours, between 4 hours and 8 hours, etc. In some examples, the soak-time threshold may be a function of an amount of time for exhaust temperatures, engine heat from combustion during a previous drive cycle, etc., to reach a point where such factors may not adversely affect the outcome of the humidity sensor diagnostic.

In still further examples, conditions being met at 405 may additionally or alternatively include an indication that an amount of DEF stored in the DEF tank (e.g. 239) is greater than a threshold amount, such that DEF may be reliably injected into the exhaust system, as will be described in further detail below.

In yet another example, conditions being met at 405 may additionally or alternatively include an indication that there is not degradation in the intake system, exhaust system, or engine which would adversely affect the outcome of the humidity sensor diagnostic.

If, at 405, it is indicated that conditions are not met for conducting the humidity sensor diagnostic, method 400 may proceed to 410. At 410, method 400 may include maintaining current vehicle operating parameters. Maintaining current vehicle operating parameters at 410 may include maintaining engine operation if the vehicle is being propelled at least in part, via the engine. Other examples may include maintaining operation of a motor (e.g. 120) to propel the vehicle, if the vehicle is being propelled at least in part, via the motor. In still other examples, if the vehicle is not in operation, but conditions are not yet indicated to be met for conducting the humidity sensor diagnostic, method 400 may include maintaining relevant components of the vehicle system in their current states. Method 400 may then end.

Alternatively, if, at 405, it is indicated that conditions are met for conducting the humidity sensor diagnostic, method 400 may proceed to 415. At 415, method 400 may include waking the vehicle controller, such that the diagnostic may be conducted. As an example, one or more of the above-mentioned conditions may be indicated to be met for conducting the humidity sensor diagnostic at a key-off event, where the vehicle system is shut down. However, for conditions to be fully met for conducting the humidity sensor diagnostic, the vehicle system may need to soak for the threshold soak-time duration. Thus, at the key-off event the vehicle controller may request a humidity sensor diagnostic, or humidity sensor rationalization, to be conducted during the vehicle-off condition, and may thus set a timer that may be coupled to a circuit that may enable the circuit to wake the controller in response to the timer duration expiring.

Responsive to waking the controller at 415, method 400 may proceed to 420. At 420, method 400 may include commanding or maintaining a throttle (e.g. 262) to a predetermined open position. In some examples, the predetermined open position may comprise a position greater than closed but not fully open, or fully open. By commanding or maintaining the throttle at the predetermined open position, the humidity sensor (e.g. 258) positioned in the intake system may sense a similar humidity as that of air external to the vehicle (e.g. in a vicinity immediately surrounding the vehicle). Furthermore, at 420, method 400 may include commanding or maintaining both a CPV (e.g. 261) and an EGR valve (e.g. 253) in their respective closed configurations.

With the throttle commanded to the predetermined open position, and with the CPV and EGR valve closed, method 400 may proceed to 425 and may include obtaining baseline humidity data. For example, because the humidity sensor may sense a similar environment as that immediately surrounding the vehicle, due to the throttle being in the predetermined open position, it may be understood that the baseline humidity data obtained at 425 may represent humidity of the air in the vicinity immediately surrounding the vehicle.

Baseline humidity data may be retrieved via the controller after a predetermined duration subsequent to commanding the throttle to the predetermined open position. The predetermined duration may comprise a duration where it is expected that the air in the intake system is substantially equivalent to the air immediately surrounding the vehicle. In other words, the predetermined duration may comprise a duration where air immediately external to the vehicle may sufficiently mix with air in the intake system of the vehicle, until the air in the intake system is substantially equivalent to the air immediately external to the vehicle. Thus, the humidity sensor readings during the obtaining the baseline data may represent humidity substantially equivalent to humidity immediately surrounding the vehicle. In examples where the throttle is already at the predetermined open position, then baseline data may be obtained immediately at 425, as the air in the intake system would already be expected to be substantially equivalent to air immediately surrounding the vehicle.

Baseline humidity data may be obtained via one or more readings or output signals sent from the humidity sensor to the controller. In a case where a plurality of readings are obtained, the readings may be averaged or otherwise processed to obtain a high confidence baseline humidity measurement. The baseline humidity sensor data may be stored at the controller.

Proceeding to 430, method 400 may include injecting a predetermined amount of DEF into the vehicle exhaust system upstream of the SCR catalyst. The predetermined amount may comprise an amount of DEF that is likely to result in the humidity sensor outputting a response greater than a threshold response over the baseline humidity measurement under conditions where the humidity sensor is functioning as desired. As will be discussed below, in some examples, the predetermined amount of DEF injected may further be a function of a current level of ammonia stored at the SCR catalyst compared to a desired level. For example, more DEF may in some examples be injected if the current level of ammonia stored at the SCR catalyst is lower, as compared to a situation where the current level of ammonia stored at the SCR catalyst is higher. In a case where more DEF is injected based on the current level of ammonia stored at the SCR catalyst, any thresholds (discussed below) related to the rationalizing of the humidity sensor may be adjusted accordingly. For example, a threshold for indicating the humidity sensor is functioning as desired may be raised under conditions where more DEF is injected than usual.

At 430, method 400 may further include rotating the engine in reverse unfueled. As mentioned above, rotating the engine in reverse may be conducted via a motor (e.g. 120), via power from an onboard energy storage device (e.g. 150). In some examples, the engine may be rotated for a predetermined duration at a predetermined speed prior to the injection of the DEF into the exhaust system. By rotating the engine prior to DEF injection, the DEF injection may be more likely to vaporize and easily be drawn into the intake manifold where the water content may excite the humidity sensor.

As mentioned, the engine may be rotated in reverse in some examples prior to injection of DEF into the exhaust system. In some examples, the predetermined duration and predetermined speed of engine rotation in reverse may comprise a predetermined duration and predetermined speed such that a predetermined temperature may be reached in the exhaust system/engine. The predetermined temperature may comprise a temperature that encourages vaporization of the DEF, such that it may be readily drawn into the intake system via the engine spinning in reverse.

In some examples, the speed at which the engine is rotated in reverse prior to the DEF injection may be the same or substantially equivalent speed at which the engine is rotated after the DEF injection. However, in other examples, the speed may not be the same, and the engine speed subsequent to the DEF injection may be either less than, or greater than engine speed just prior to the DEF injection.

Subsequent to the DEF injection, the engine may be spun for (another) predetermined duration in reverse, where such a predetermined duration may comprise an amount of time where it is expected that the DEF would be routed to the intake system to excite the humidity sensor, but not routed past the throttle and to atmosphere. In other words, the duration of engine spinning in reverse may comprise a duration whereby the humidity sensor may be excited via the water content of the DEF, but where duration is not sufficient to route the DEF out of the intake system to atmosphere.

Proceeding to 435, method 400 may include indicating whether the humidity sensor response during the spinning the engine unfueled in reverse (subsequent to the injection of DEF into the exhaust system) is greater than the baseline humidity data obtained at step 425 by the threshold amount. If the response is indicated to not be greater than the threshold amount subsequent to the predetermined duration of engine spinning in reverse after injection of DEF into the exhaust system, method 400 may proceed to 440. At 440, method 400 may include indicating that the humidity sensor is degraded, or is not functioning as desired. Proceeding to 445, method 400 may include updating vehicle operating parameters to reflect the degraded humidity sensor. In some examples, updating vehicle operating parameters at 445 may include the vehicle controller commanding an electric-only mode of vehicle operation as frequently as possible, to mitigate any issues with engine operation stemming from an inaccurate humidity measurement. In other examples, humidity may be estimated or approximated via sources external to the vehicle. For example, humidity estimations may be retrieved via V2V or V2X communications, where the vehicle controller initiates communication with one or more other vehicles or infrastructures within a predetermined threshold radius or other distance of the vehicle, in order to retrieve reasonable estimates of humidity in close proximity to the vehicle. In other examples, humidity measurements may be retrieved via GPS or other onboard navigation system, and may include cross-referencing humidity data with humidity data retrieved from the internet, for example. In still other examples, humidity may be estimated via other sensors positioned in the vehicle, if the vehicle is equipped with such sensors. In some examples, such a humidity estimate may be retrieved from one or more sensors that may reflect a similar humidity as that in the intake system of the vehicle.

Subsequent to updating vehicle operating parameters at 445 in response to indicated degradation of the humidity sensor position in the vehicle intake system, method 400 may proceed to 450. At 450, method 400 may include stopping the engine spinning in reverse, and may include spinning the engine unfueled in the default, or forward, direction, for a predetermined duration. In such an example, an H-bridge, such as that depicted in FIGS. 3A-3B, may be utilized such that the vehicle controller may actuate the engine to rotate in the forward direction. As with the reverse engine spin, a default or forward engine spin may be carried out via the motor (e.g. 120), using power supplied via the onboard energy storage device (e.g. 150), which may comprise a battery, for example.

Spinning the engine unfueled in the forward direction may comprise spinning the engine unfueled in the forward direction for a predetermined duration. Spinning the engine unfueled in the forward direction may serve at least two purposes. First, spinning the engine in the forward direction may result in a vacuum in the intake system, which may thus route the injected DEF back to the exhaust system. Second, as discussed above, the exhaust system may include a selective catalytic reduction (SCR) catalyst. Thus, by spinning the engine unfueled in the forward direction, the DEF may be used to load the SCR. More specifically, as mentioned above, DEF comprises a mixture of water and urea. The urea from the injected DEF breaks down to form ammonia ($NH_3$), which is the reductant utilized in reactions with oxides of nitrogen ($NO_x$) from exhaust flow while the engine is in operation and is combusting fuel and air. Briefly, the ammonia is adsorbed onto the SCR catalyst, which is then utilized to convert $NO_x$ to nitrogen and water, with $CO_2$ as a reaction product.

The complete decomposition of urea takes place in several steps when the vehicle engine is combusting air and fuel. The water in the solution is first evaporated, releasing the urea. The urea then decomposes to release one ammonia molecule and one isocyanic acid (HNCO) molecule. The next step is for the HNCO to decompose to release a second $NH_3$ molecule, and one $CO_2$. The two ammonia molecules may then be available for $NO_x$ reduction.

However, it is known that urea decomposition to two ammonia molecules does not reach completion in the gas phase at temperatures below about 300° C. More specifically, only about 20% of urea decomposes to HNCO and $NH_3$ in the gas phase at 300° C., and HNCO has been shown to be very stable in the gas phase. Thus, during low temperature conditions such as when the engine is spun in the forward direction in the presence of DEF injected into the exhaust system upstream of the SCR catalyst, very nearly all of the urea decomposition may occur on the surfaces of the SCR catalyst. In this way, the SCR catalyst may be loaded with ammonia to be utilized in reactions with $NO_x$ at a next engine startup event, where such a startup event includes the engine combusting air and fuel. By pre-loading the SCR catalyst, injections of DEF may be delayed or otherwise altered as a function of the loading state of the SCR catalyst at a next engine startup event.

As mentioned, to route DEF from the intake system to the exhaust system, to populate the SCR catalyst with ammonia, the engine may be spun unfueled for the predetermined duration. The predetermined duration may thus include an amount of time expected for all of the DEF to be completely re-rerouted back to the exhaust system. In some examples, engine speed may comprise a same or substantially equivalent engine speed in the forward direction as the speed the engine was spun in the reverse direction. However, in other examples, engine speed may be differentially controlled when spinning the engine in the forward direction at step 450. For example, engine speed may be increased in some examples. In other examples, engine speed may be decreased in the forward direction as compared to when it was spun in the reverse direction. In still other examples, engine speed may be controlled to achieve a desired engine temperature. The desired temperature may in some examples comprise a temperature where it is likely that all the DEF is routed from the intake system to the exhaust system.

In some examples, the vehicle controller may include or employ an SCR catalyst model that may estimate an amount of ammonia that is loaded onto the SCR catalyst. Thus, a loading state of the SCR catalyst may be known or estimated via the vehicle controller, prior to conducting the humidity sensor diagnostic. Based on the amount injected, and current canister loading state, the vehicle controller may estimate an updated loading state of the SCR catalyst (where loading state refers to an amount of ammonia loaded onto the SCR catalyst). Accordingly, proceeding to 455, method 400 may include indicating an updated SCR catalyst loading state, after the engine has been spun unfueled in the forward direction for the predetermined duration. While not explicitly illustrated, in some examples, one or more additional DEF injections may be performed during the spinning the engine unfueled in the forward direction, as a function of SCR catalyst loading state. For example, if a current loading state (prior to conducting the humidity sensor diagnostic) is known, and it is inferred from the SCR catalyst model that one DEF injection would not sufficiently populate the SCR catalyst with a desired level (e.g. saturation level) of ammonia, then one or more additional injections of DEF may be conducted during the spinning the engine unfueled in the forward direction. The desired level of ammonia loaded onto the catalyst may comprise a level at which reductions in emissions may be accomplished during a subsequent cold-start of the engine, for example.

Subsequent to updating a loading state of the SCR catalyst at 455, method 400 may proceed to 460. At 460, method 400 may include stopping the spinning the engine in the forward direction, and may further include returning the throttle to the default configuration. In other examples, the throttle may be maintained in its current configuration. Stopping the engine may comprise the vehicle controller commanding the electric motor to slow the vehicle engine to a halt, or in other examples the motor may be shut off, and the engine may spin to a halt. Method 400 may then end.

Returning to 435, if the humidity sensor response is greater than the baseline data by the threshold amount subsequent to injecting the DEF into the exhaust system and rotating the engine unfueled in reverse, method 400 may proceed to 465. At 465, method 400 may include indicating that the humidity sensor is functioning as desired. For example, such an indication may be stored at the controller, indicating a time and date of the successful humidity sensor test diagnostic. Proceeding to 470, method 400 may include updating vehicle operation parameters. For example, since the outcome of the humidity sensor indicated that the humidity sensor is functioning as desired, vehicle operating parameters may be maintained at 470. Furthermore, a humidity sensor diagnostic test schedule may be updated, to reflect the recent results of the humidity sensor test diagnostic.

Continuing to 450, the rest of method 400 may be conducted in a substantially equivalent fashion as that described above. Briefly, the engine may be controlled via the vehicle controller to stop spinning in the reverse direction, and may be commanded to rotate in the forward direction for a predetermined duration, to populate or load the SCR catalyst with ammonia to prepare the vehicle for a subsequent start-up event. During the spinning the engine in the forward direction, one or more additional injections of DEF may be conducted, based on the model of the loading state of the SCR catalyst, and a desired loading state.

At 455, the loading state of the SCR catalyst may be updated as a function of the amount of DEF injected into the exhaust system. Such an updated loading state may be based on a model of SCR catalyst loading state, as discussed above. Subsequent to updating the loading state of the SCR catalyst, method 400 may proceed to 460, and may include stopping the engine spinning in reverse, and may include restoring the throttle to the default position, or maintaining the throttle in its current configuration. Method 400 may then end.

Thus, a method may include injecting a diesel exhaust fluid into an exhaust system of an engine of the vehicle, and rotating the engine unfueled in reverse to draw the diesel exhaust fluid into an intake system of the engine. The method may include rationalizing a humidity sensor positioned in the intake system subsequent to the injection of the diesel exhaust fluid into the exhaust system and the rotating the engine unfueled in reverse, and rotating the engine unfueled in a forward direction subsequent to rationalizing the humidity sensor, to route the diesel exhaust fluid back into the exhaust system.

In one example, the method may further comprise obtaining a baseline humidity sensor measurement from the humidity sensor positioned in the intake system just prior to injecting the diesel exhaust fluid into the exhaust system and rotating the engine unfueled in reverse, where obtaining the baseline humidity sensor measurement includes commanding an intake system throttle to a predetermined open position, to couple the intake system to atmosphere. In such a method, rationalizing the humidity sensor may include indicating that the humidity sensor is functioning as desired responsive to a humidity sensor test measurement during the drawing the diesel exhaust fluid into the intake system being greater than the baseline humidity sensor measurement by at least a threshold amount.

In another example, the method may further comprise maintaining a canister purge valve configured to couple an evaporative emissions system of the vehicle to an engine system, in a closed conformation, and maintaining an exhaust gas recirculation valve configured to enable exhaust gas to be routed back to the intake system, in a closed conformation during the rotating the engine unfueled in both the reverse direction and the forward direction.

In yet another example of the method, injecting the diesel exhaust fluid into the exhaust system may further comprise injecting the diesel exhaust fluid into the exhaust system upstream of a selective catalytic reduction catalyst, and wherein rotating the engine in the forward direction subsequent to rationalizing the humidity sensor routes the diesel exhaust fluid into the exhaust system in order to load the selective catalytic reduction catalyst with ammonia. In such an example, a controller of the vehicle may employ a model to infer a loading state of the selective catalytic reduction catalyst, where inferring the loading state involves determining an amount of ammonia loaded on the selective catalytic reduction catalyst. In some examples, such a method may further comprise injecting additional diesel exhaust fluid into the exhaust system during the rotating the engine in the forward direction, based on a desired loading amount of the selective catalytic reduction catalyst with ammonia. As an example, the diesel exhaust fluid may comprise a mixture of urea and water, and where the urea may react with the selective catalytic reduction catalyst to form ammonia.

In still another example of the method, injecting the diesel exhaust fluid into the exhaust system of the engine is commenced via a wake-up of the controller at a predetermined duration of time after a vehicle-off event, where a request to rationalize the humidity sensor is requested for the vehicle-off event.

Turning now to FIG. 5, an example timeline 500 is shown for conducting a humidity sensor diagnostic, according to the methods depicted herein and with reference to FIG. 4, and as applied to the systems depicted herein and with reference to FIGS. 1-2. Timeline 500 includes plot 505, indicating an engine speed, over time. Engine speed may represent speed of the engine while the engine is being spun, or rotated, in the forward or reverse direction. In such examples, an electric motor (e.g. 120) may be used to rotate the motor in the forward or reverse direction. Timeline 500 further includes plot 510, indicating whether fuel injection to one or more engine cylinders is on, or off, over time. Timeline 500 further includes plot 515, indicating a position of an intake throttle (e.g. 262), over time. Timeline 500 further includes plot 520, indicating whether a DEF injector (e.g. 243) is on (where DEF is injected) or off (where DEF injection is prevented), over time. While not explicitly illustrated, it may be understood that in order for DEF to be injected, a DEF pump (e.g. 246) may be activated to pressurize DEF to route it to the DEF injector.

Timeline 500 further includes plot 525, indicating an output signal from a humidity sensor (e.g. 258), over time, where the output signal corresponds to an estimated, inferred, or measured humidity in the vicinity of the humidity sensor. Line 526 represents a baseline humidity in an intake system of the vehicle. Line 527 represents a threshold humidity (humidity greater than the baseline humidity by a threshold amount), which, if reached or exceeded during a humidity sensor diagnostic, indicates that the humidity sensor is functioning as desired.

Timeline 500 further includes plot 530, indicating whether conditions are met (yes) or not (no) for conducting the humidity sensor diagnostic, discussed in detail above at step 405 of method 400. Timeline 500 further includes plot 535, indicating a loading state of an SCR catalyst, over time. Here, loading state may refer an amount of ammonia ($NH_3$) loaded onto the SCR catalyst. Line 536 represents a desired SCR catalyst loading state. Timeline 500 further includes plot 540, indicating whether the humidity sensor is functioning as desired (yes) or not (no), over time.

At time t0, the engine is off (plot 505) and thus fuel injection (plot 510) to one or more engine cylinders is off. The intake throttle is in a default closed position (plot 515), and the DEF injector is off (plot 520). Conditions are not yet indicated to be met for conducting the humidity sensor diagnostic (plot 530). The SCR catalyst is populated with some ammonia (plot 535), but is not saturated, and there is no conclusive information indicating that the humidity sensor is not functioning as desired, and thus, the humidity sensor is indicated to be functioning as desired (plot 540).

Thus, it may be understood that at time t0 the vehicle is an off configuration. The controller may not be awake at time t0, thus the humidity sensor may not be actively monitoring/measuring humidity in the intake system. Accordingly, between time t0 and t1, plot 525 is indicated as a dashed line, representing an actual humidity in the intake system, for reference.

At time t1, conditions are indication to be met for conducting the humidity sensor diagnostic. As discussed above at step 405 of method 400, there may be a plurality of conditions that may be met prior to conducting the humidity sensor diagnostic. In this example timeline, it may be understood that at time t1, a soak-time, or vehicle-off duration since a key-off event is greater than a threshold soak-time duration. In other words, between time t0 and t1, a humidity sensor diagnostic is requested, however the soak-time duration is less than the threshold soak-time duration. Thus, between time t0 and t1, conditions are not indicated to be met for conducting the humidity sensor diagnostic, but at time t1 conditions are indicated to be met as the soak-time threshold duration is indicated.

Accordingly, at time t1, the throttle (e.g. 262) is controlled to a predetermined open position, as discussed above at step 420 of method 400. The predetermined open position may comprise a position such that the intake system is coupled to atmosphere, such that the intake system air may become substantially equivalent to external air immediately surrounding the vehicle.

With the throttle controlled to the predetermined open position, between time t1 and t2, one or more humidity sensor measurements are obtained via the vehicle controller. More specifically, the humidity sensor may output a signal which is a function of humidity, and such a signal may be communicated to the vehicle controller. As discussed, in some examples, a plurality of measurements may be obtained, and averaged or otherwise processed to obtain a high confidence humidity measurement. Such a measurement may comprise a baseline humidity measurement. Accordingly, by time t2, a baseline humidity measurement, indicated by line 526, is established and stored at the vehicle controller.

At time t2, subsequent to obtaining the baseline humidity sensor data, represented by line 526, the engine is initiated to rotate in reverse at a predetermined engine speed (RPM) for a predetermined duration. Rotating the engine in reverse may be carried out via a motor (e.g. 120). With the engine rotating in reverse, between time t2 and t3, a single injection of DEF is commanded via the vehicle controller, upstream of the SCR catalyst. With the engine rotating in reverse, and with DEF injected into the exhaust system, a vacuum may develop in the exhaust system which may route the injected DEF into the intake manifold of the vehicle, where the humidity sensor may respond if the humidity sensor is functioning as desired.

At time t3, the humidity sensor outputs a signal that is substantially equivalent to the threshold humidity (humidity greater than the baseline humidity by a threshold amount), and between time t3 and t4, the humidity sensor output signal exceeds the threshold. Accordingly, the humidity sensor is indicated to be functioning as desired (e.g. the diagnosis of the humidity sensor as functioning as desired remains unchanged).

At time t4, the predetermined duration of rotating the engine in reverse expires. Accordingly, between time t4 and t5, the engine is slowed to an off configuration, and then at time t5 the engine is again commenced rotating unfueled via the electric motor, yet this time the engine is rotated in the forward, or default, direction. Furthermore, responsive to rotating the engine in the forward direction, the throttle is commanded to a more open position than that during the rotating the engine unfueled in reverse. In this way, an amount of air flow through the intake system and into the exhaust system may be increased.

Between time t5 and t6, the engine is rotated in the forward direction, and two more injections of DEF are commanded via the vehicle controller. The injections may be based on a loading state of the SCR catalyst, which may be indicated via a model stored at the controller, for example. Such a model may be based on at least engine run time, DEF injection number and amount, etc. More specifically, the model may indicate current SCR catalyst loading state, and the model may further indicate a desired SCR catalyst loading state, indicated by line 536. The desired loading state may represent a loading state that may reduce undesired emissions at a subsequent engine cold-start event, for example.

With the engine rotating in the forward direction between time t5 and t6, and responsive to the additional injections of DEF into the exhaust system upstream of the SCR catalyst, SCR loading state rises until the desired SCR catalyst loading state is reached.

At time t6, the predetermined duration for rotating the engine in the forward direction expires. Thus, at time t6 it may be understood that the DEF that was routed to the intake system (e.g. the first injection between time t2 and t3) is now all re-rerouted out of the intake system and into the exhaust system, where it may populate the SCR catalyst with ammonia, along with the two DEF injections (between time t5 and t6) which may further serve to populate the SCR catalyst with ammonia.

Responsive to the predetermined duration for rotating the engine in the forward direction expiring, the engine may be controlled to an off configuration, and the throttle may be controlled to its default vehicle-off configuration.

In this way, a humidity sensor positioned in the intake system of a hybrid vehicle may be periodically rationalized, such that it may be indicated as to whether the humidity sensor is functioning as desired. Such a method utilizing DEF injection into the exhaust system and subsequent routing of the DEF to the intake system where it may interact with the humidity sensor, may enable humidity sensor rationalization in a vehicle where engine run time is limited, such as a hybrid electric vehicle (HEV), plug-in hybrid electric vehicle (PHEV), S/S/, etc. By using such a method, rationalizing the humidity sensor via other humidity sensors in the vehicle, temperature sensors, pressure sensors, oxygen sensors, etc., may be avoided, which may reduce uncertainty in the humidity estimations.

The technical effect is to recognize that DEF comprises a solution in which the water content of the DEF may be used to rationalize the humidity sensor, and that routing DEF to the intake humidity sensor may be accomplished via rotating the engine unfueled in reverse subsequent to a DEF injection into the exhaust system. A further technical effect is to recognize that the DEF injected into the exhaust system, and routed to the intake system, may further be routed back to the exhaust system subsequent to rationalization of the humidity sensor. In this way, the DEF may be purged from the intake system subsequent to the humidity sensor diagnostic. Thus, a still further technical effect is to recognize that the DEF being re-routed to the exhaust system may be utilized to load an SCR catalyst with ammonia, for use in a subsequent engine start event.

The systems described herein, and with reference to FIGS. 1-3B, along with the methods described herein, and with reference to FIG. 4, may enable one or more systems and one or more methods. In one example, a method comprises obtaining a baseline humidity measurement via a humidity sensor positioned in an intake system of an engine; while rotating the engine unfueled in a reverse direction, injecting a fluid into an exhaust system coupled to the engine which is drawn by the engine into the intake system; and rationalizing the humidity sensor as a function of a humidity measurement of the injected fluid by the humidity sensor and the baseline humidity measurement. In a first example of the method, the method may further include wherein the fluid comprises diesel exhaust fluid. A second example of the method optionally includes the first example, and further includes wherein obtaining the baseline humidity measurement comprises commanding a throttle positioned in the intake system to a predetermined open position to couple the intake system and humidity sensor to atmosphere just prior to rotating the engine unfueled in the reverse direction. A third example of the method optionally includes any one or more or each of the first and second examples, and further includes wherein obtaining the baseline humidity measurement and rationalizing the humidity sensor via rotating the engine unfueled in reverse and injecting the fluid into the exhaust is commenced responsive to a predetermined duration of time elapsing since a vehicle-off event, where rationalizing the humidity sensor is requested during the vehicle-off event. A fourth example of the method optionally includes any one or more or each of the first through third examples, and further comprising rotating the engine in reverse at a predetermined engine speed. A fifth example of the method optionally includes any one or more or each of the first through fourth examples, and further includes wherein rotating the engine in reverse is for a predetermined duration which comprises an amount of time where a response from the humidity sensor is expected provided that the humidity sensor is functioning as desired, without routing the fluid to atmosphere. A sixth example of the method optionally includes any one or more or each of the first through fifth examples, and further includes wherein rationalizing the humidity sensor further comprises indicating that the humidity sensor is functioning as desired responsive to the humidity sensor outputting a signal that is greater than a threshold amount above the baseline humidity measurement; and indicating that the humidity sensor is not functioning as desired responsive to the humidity sensor outputting a signal that is lower than the threshold amount above the baseline humidity measurement. A seventh example of the method optionally includes any one or more or each of the first through sixth examples, and further comprises responsive to rationalizing the humidity sensor, rotating the engine unfueled in a forward direction, to route the fluid from the intake system back into the exhaust system.

Another example of a method comprises injecting a diesel exhaust fluid into an exhaust system of an engine of the vehicle, and rotating the engine unfueled in reverse to draw the diesel exhaust fluid into an intake system of the engine; rationalizing a humidity sensor positioned in the intake system subsequent to the injection of the diesel exhaust fluid into the exhaust system and the rotating the engine unfueled in reverse; and rotating the engine unfueled in a forward direction subsequent to rationalizing the humidity sensor, to route the diesel exhaust fluid back into the exhaust system. In a first example of the method, the method further comprises obtaining a baseline humidity sensor measurement from the humidity sensor positioned in the intake system just prior to injecting the diesel exhaust fluid into the exhaust system and rotating the engine unfueled in reverse, where obtaining the baseline humidity sensor measurement includes commanding an intake system throttle to a predetermined open position, to couple the intake system to atmosphere; and wherein rationalizing the humidity sensor includes indicating that the humidity sensor is functioning as desired responsive to a humidity sensor test measurement during the drawing the diesel exhaust fluid into the intake system being greater than the baseline humidity sensor measurement by at least a threshold amount. A second example of the method optionally includes the first example, and further comprises maintaining a canister purge valve, configured to couple an evaporative emissions system of the vehicle to an engine system, in a closed conformation, and maintaining an exhaust gas recirculation valve configured to enable exhaust gas to be routed back to the intake system, in a closed conformation during the rotating the engine unfueled in both the reverse direction and the forward direction. A third example of the method optionally includes any one or more or each of the first and second examples, and further includes wherein injecting the diesel exhaust fluid into the exhaust system further comprises injecting the diesel exhaust fluid into the exhaust system upstream of a selective catalytic reduction catalyst; and wherein rotating the engine in the forward direction subsequent to rationalizing the humidity sensor routes the diesel exhaust fluid into the exhaust system in order to load the selective catalytic reduction catalyst with ammonia. A fourth example of the method optionally includes any one or more or each of the first through third examples, and further includes wherein a controller of the vehicle employs a model to infer a loading state of the selective catalytic reduction catalyst, where inferring the loading state involves determining an amount of ammonia loaded on the selective catalytic reduction catalyst. A fifth example of the method optionally includes any one or more or each of the first through fourth examples, and further comprises injecting additional diesel exhaust fluid into the exhaust system during the rotating the engine in the forward direction, based on a desired loading amount of the selective catalytic reduction catalyst with ammonia. A sixth example of the method optionally includes any one or more or each of the first through fifth examples, and further includes wherein the diesel exhaust fluid comprises a mixture of urea and water, and where the urea reacts with the selective catalytic reduction catalyst to form ammonia. A seventh example of the method optionally includes any one or more or each of the first through sixth examples, and further includes wherein the injecting the diesel exhaust fluid into the exhaust system of the engine is commenced via a wake-up of the controller at a predetermined duration of time after a vehicle-off event, where a request to rationalize the humidity sensor is requested for the vehicle-off event.

An example of a system for a vehicle comprises an engine system including an intake system, exhaust system, and engine; a diesel exhaust fluid injection system configured to inject a diesel exhaust fluid into the exhaust system upstream of a selective catalytic reduction catalyst; a motor configured to at least rotate the engine unfueled via power from a battery; a humidity sensor positioned in the intake system; and a controller storing instructions in non-transitory memory that, when executed, cause the controller to: responsive to conditions being met for conducting a humidity sensor diagnostic test, rotate the engine unfueled in reverse at a predetermined engine speed for a predetermined duration via the motor, inject a predetermined amount of diesel exhaust fluid into the exhaust system where the rotating the engine unfueled in reverse draws the diesel exhaust fluid into the intake system to rationalize the humidity sensor; and subsequent to rotating the engine unfueled in reverse for the predetermined duration, stop the rotating the engine unfueled in reverse and commence rotating the engine unfueled in a forward direction for a predetermined duration via the motor, to route the diesel exhaust fluid back to the exhaust system in order to load the selective catalytic reduction catalyst with ammonia, and where conditions being met include at least a predetermined vehicle-off duration. In a first example of the system, the system further comprises a throttle positioned in the intake system upstream of the humidity sensor, and wherein the controller stores additional instructions to: obtain a baseline humidity measurement from the humidity sensor just prior to rotating the engine unfueled in reverse by commanding the throttle to a predetermined open position to couple the intake system to atmosphere; maintain the throttle at the predetermined open position or a fully open position during the rotating the engine unfueled in reverse; and command or maintain the throttle to the fully open position just prior to rotating the engine unfueled in the forward direction, where rationalizing the humidity sensor includes indicating that the humidity sensor is functioning as desired responsive to a humidity measurement during the rotating the engine unfueled in reverse being greater than the baseline humidity measurement by at least a threshold amount. A second example of the system optionally includes the first example, and further includes wherein the diesel exhaust fluid comprises a mixture of urea and water, and where the water stimulates the humidity sensor to rationalize the humidity sensor, and where the urea is converted to ammonia at the selective catalytic reduction catalyst. A third example of the system optionally includes any one or more or each of the first and second examples, and further comprises an exhaust gas recirculation system selectively coupled to the engine system via an exhaust gas recirculation valve; an evaporative emissions system selectively coupled to the engine system via a canister purge valve; and wherein the controller stores additional instructions to command both the exhaust gas recirculation valve and the canister purge valve to closed positions during the rotating the engine unfueled in both the forward and reverse directions.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
   obtaining a baseline humidity measurement via a humidity sensor positioned in an intake system of an engine;
   while rotating the engine unfueled in a reverse direction, injecting a fluid into an exhaust system coupled to the engine which is drawn by the engine into the intake system; and
   rationalizing the humidity sensor as a function of a humidity measurement of the injected fluid by the humidity sensor and the baseline humidity measurement.

2. The method of claim 1, wherein the fluid comprises diesel exhaust fluid.

3. The method of claim 1, wherein obtaining the baseline humidity measurement comprises commanding a throttle positioned in the intake system to a predetermined open position to couple the intake system and humidity sensor to atmosphere just prior to rotating the engine unfueled in the reverse direction.

4. The method of claim 3, wherein obtaining the baseline humidity measurement and rationalizing the humidity sensor via rotating the engine unfueled in reverse and injecting the fluid into the exhaust is commenced responsive to a predetermined duration of time elapsing since a vehicle-off event, where rationalizing the humidity sensor is requested during the vehicle-off event.

5. The method of claim 1, further comprising, rotating the engine in reverse at a predetermined engine speed.

6. The method of claim 1, wherein rotating the engine in reverse is for a predetermined duration which comprises an amount of time where a response from the humidity sensor is expected provided that the humidity sensor is functioning as desired, without routing the fluid to atmosphere.

7. The method of claim 1, wherein rationalizing the humidity sensor further comprises indicating that the humidity sensor is functioning as desired responsive to the humidity sensor outputting a signal that is greater than a threshold amount above the baseline humidity measurement; and
   indicating that the humidity sensor is not functioning as desired responsive to the humidity sensor outputting a signal that is lower than the threshold amount above the baseline humidity measurement.

8. The method of claim 1, further comprising responsive to rationalizing the humidity sensor, rotating the engine unfueled in a forward direction, to route the fluid from the intake system back into the exhaust system.

9. A method for a vehicle, comprising:
   injecting a diesel exhaust fluid into an exhaust system of an engine of the vehicle, and rotating the engine unfueled in reverse to draw the diesel exhaust fluid into an intake system of the engine;
   rationalizing a humidity sensor positioned in the intake system subsequent to the injection of the diesel exhaust fluid into the exhaust system and the rotating the engine unfueled in reverse; and
   rotating the engine unfueled in a forward direction subsequent to rationalizing the humidity sensor, to route the diesel exhaust fluid back into the exhaust system.

10. The method of claim 9, further comprising obtaining a baseline humidity sensor measurement from the humidity sensor positioned in the intake system just prior to injecting the diesel exhaust fluid into the exhaust system and rotating the engine unfueled in reverse, where obtaining the baseline humidity sensor measurement includes commanding an intake system throttle to a predetermined open position, to couple the intake system to atmosphere; and
   wherein rationalizing the humidity sensor includes indicating that the humidity sensor is functioning as desired responsive to a humidity sensor test measurement during the drawing the diesel exhaust fluid into the intake system being greater than the baseline humidity sensor measurement by at least a threshold amount.

11. The method of claim 9, further comprising maintaining a canister purge valve, configured to couple an evaporative emissions system of the vehicle to an engine system, in a closed conformation, and maintaining an exhaust gas recirculation valve configured to enable exhaust gas to be routed back to the intake system, in a closed conformation during the rotating the engine unfueled in both the reverse direction and the forward direction.

12. The method of claim 9, wherein injecting the diesel exhaust fluid into the exhaust system further comprises injecting the diesel exhaust fluid into the exhaust system upstream of a selective catalytic reduction catalyst; and
   wherein rotating the engine in the forward direction subsequent to rationalizing the humidity sensor routes the diesel exhaust fluid into the exhaust system in order to load the selective catalytic reduction catalyst with ammonia.

13. The method of claim 12, wherein a controller of the vehicle employs a model to infer a loading state of the selective catalytic reduction catalyst, where inferring the loading state involves determining an amount of ammonia loaded on the selective catalytic reduction catalyst.

14. The method of claim 12, further comprising injecting additional diesel exhaust fluid into the exhaust system during the rotating the engine in the forward direction, based on a desired loading amount of the selective catalytic reduction catalyst with ammonia.

15. The method of claim 12, wherein the diesel exhaust fluid comprises a mixture of urea and water, and where the urea reacts with the selective catalytic reduction catalyst to form ammonia.

16. The method of claim 9, wherein the injecting the diesel exhaust fluid into the exhaust system of the engine is commenced via a wake-up of the controller at a predetermined duration of time after a vehicle-off event, where a request to rationalize the humidity sensor is requested for the vehicle-off event.

17. A system for a vehicle, comprising:
an engine system including an intake system, exhaust system, and engine;
a diesel exhaust fluid injection system configured to inject a diesel exhaust fluid into the exhaust system upstream of a selective catalytic reduction catalyst;
a motor configured to at least rotate the engine unfueled via power from a battery;
a humidity sensor positioned in the intake system; and
a controller storing instructions in non-transitory memory that, when executed, cause the controller to:
responsive to conditions being met for conducting a humidity sensor diagnostic test, rotate the engine unfueled in reverse at a predetermined engine speed for a predetermined duration via the motor, inject a predetermined amount of diesel exhaust fluid into the exhaust system where the rotating the engine unfueled in reverse draws the diesel exhaust fluid into the intake system to rationalize the humidity sensor; and
subsequent to rotating the engine unfueled in reverse for the predetermined duration, stop the rotating the engine unfueled in reverse and commence rotating the engine unfueled in a forward direction for a predetermined duration via the motor, to route the diesel exhaust fluid back to the exhaust system in order to load the selective catalytic reduction catalyst with ammonia, and where conditions being met include at least a predetermined vehicle-off duration.

18. The system of claim 17, further comprising a throttle positioned in the intake system upstream of the humidity sensor, and wherein the controller stores additional instructions to:
obtain a baseline humidity measurement from the humidity sensor just prior to rotating the engine unfueled in reverse by commanding the throttle to a predetermined open position to couple the intake system to atmosphere;
maintain the throttle at the predetermined open position or a fully open position during the rotating the engine unfueled in reverse; and
command or maintain the throttle to the fully open position just prior to rotating the engine unfueled in the forward direction, where rationalizing the humidity sensor includes indicating that the humidity sensor is functioning as desired responsive to a humidity measurement during the rotating the engine unfueled in reverse being greater than the baseline humidity measurement by at least a threshold amount.

19. The system of claim 17, wherein the diesel exhaust fluid comprises a mixture of urea and water, and where the water stimulates the humidity sensor to rationalize the humidity sensor, and where the urea is converted to ammonia at the selective catalytic reduction catalyst.

20. The system of claim 17, further comprising:
an exhaust gas recirculation system selectively coupled to the engine system via an exhaust gas recirculation valve;
an evaporative emissions system selectively coupled to the engine system via a canister purge valve; and
wherein the controller stores additional instructions to command both the exhaust gas recirculation valve and the canister purge valve to closed positions during the rotating the engine unfueled in both the forward and reverse directions.

\* \* \* \* \*